(12) United States Patent
Tripp et al.

(10) Patent No.: US 10,097,574 B2
(45) Date of Patent: Oct. 9, 2018

(54) AUTO-TUNING PROGRAM ANALYSIS TOOLS BASED ON USER FEEDBACK

(71) Applicant: International Business Machines Corporation, Armonk, NY (US)

(72) Inventors: Omer Tripp, New York, NY (US); Salvatore Angelo Guarnieri, NY, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/576,118

(22) Filed: Dec. 18, 2014

(65) Prior Publication Data

US 2016/0182553 A1  Jun. 23, 2016

(51) Int. Cl.
| | | |
|---|---|---|
| *H04L 29/00* | (2006.01) | |
| *H04L 29/06* | (2006.01) | |
| *G06N 99/00* | (2010.01) | |
| *G06F 21/56* | (2013.01) | |
| *G06F 21/57* | (2013.01) | |

(52) U.S. Cl.
CPC ........ *H04L 63/1433* (2013.01); *G06F 21/562* (2013.01); *G06F 21/577* (2013.01); *G06N 99/005* (2013.01)

(58) Field of Classification Search
CPC ......... G06F 21/05; G06F 17/03; H04L 63/14; G06N 3/02; G06N 99/005
USPC .................................................. 726/25–25
See application file for complete search history.

(56) References Cited

U.S. PATENT DOCUMENTS

| | | | | |
|---|---|---|---|---|
| 7,716,297 | B1 * | 5/2010 | Wittel | .......... H04L 51/12 709/206 |
| 7,991,710 | B2 * | 8/2011 | Palatucci | ........... G06F 21/577 706/12 |
| 2008/0183685 | A1 * | 7/2008 | He | ........... G06F 17/30528 |

(Continued)

OTHER PUBLICATIONS

Bozorgi, Mehran, et al. "Beyond heuristics: learning to classify vulnerabilities and predict exploits." Proceedings of the 16th ACM SIGKDD international conference on knowledge discovery and data mining. ACM, 2010.*

(Continued)

*Primary Examiner* — Madhuri Herzog
(74) *Attorney, Agent, or Firm* — Jeffrey S. LaBaw; David H. Judson

(57) ABSTRACT

User-guided machine learning (ML) significantly reduces false alarms generated by an automated analysis tool performing static security analysis. User interactivity involves initial review and annotation of findings ("witnesses") in a report generated by the analysis tool. Those annotated findings are then used by the system to generate a "hypothesis" about how to further classify the static analysis findings in the report. The hypothesis is implemented as a machine learning classifier. To generate the classifier, a set of features are abstracted from a typical witness, and the system compares feature sets against one another to determine a set of weights for the classifier. The initial hypothesis is then validated against a second set of user-annotated findings, and the classifier is adjusted as necessary based on how close it fits the new data. Once the approach converges on a final classifier, it is used to filter remaining findings in the report.

18 Claims, 4 Drawing Sheets

(56) References Cited

U.S. PATENT DOCUMENTS

| | | | | |
|---|---|---|---|---|
| 2011/0321164 | A1* | 12/2011 | Saxena | G06F 21/577 726/25 |
| 2012/0036131 | A1* | 2/2012 | Bealing | G06F 17/30312 707/736 |
| 2014/0075560 | A1* | 3/2014 | Guy | G06F 21/577 726/25 |
| 2014/0090070 | A1 | 3/2014 | Tripp | |
| 2014/0189875 | A1 | 7/2014 | Beskrovny et al. | |
| 2016/0063394 | A1* | 3/2016 | Gokalp | G06F 17/30598 706/12 |

OTHER PUBLICATIONS

Tripp, Omer, et al. "Aletheia: Improving the usability of static security analysis." Proceedings of the 2014 ACM SIGSAC Conference on Computer and Communications Security. ACM, 2014.*

Likarish, Peter, Eunjin Jung, and Insoon Jo. "Obfuscated malicious javascript detection using classification techniques." Malicious and Unwanted Software (MALWARE), 2009 4th International Conference on. IEEE, 2009.*

IBM Security AppScan Standard, Data Sheet, Dec. 2013.

De Keukelaere et al, "Improving Your Web Application Software Development Life Cycle's Security Posture with IBM Rational AppScan," 2009.

Tripp et al, "Hybrid Security Analysis of Web JavaScript Code via Dynamic Partial Evaluation," Jul. 2014.

Anderson, "Program Analysis and Specialization for the C Programming Language," PhD Thesis, May 1994.

Tripp et al, "TAJ: Effective Taint Analysis of Web Applications," PLDI '09, Jun. 15, 2009.

Wikipedia, "Regression Analysis," http://en.wikipedia.org/wiki/Regression_analysis, Dec. 2014.

"FlowDroid—Taint Analysis," Secure Software Engineering, http://sseblog.ec-spride.de/tools/flowdroid/, Dec. 2014.

* cited by examiner

AUTO-TUNING PROGRAM ANALYSIS TOOLS BASED ON USER FEEDBACK

BACKGROUND OF THE INVENTION

Technical Field

This disclosure relates generally to identifying and remediating application vulnerabilities using static analysis tools.

Background of the Related Art

Today, most organizations depend on web-based software and systems to run their business processes, conduct transactions with suppliers, and deliver sophisticated services to customers. Unfortunately, many organizations invest little to no effort in ensuring that those applications are secure. Web-based systems can compromise the overall security of organizations by introducing vulnerabilities that hackers can use to gain access to confidential company information or customer data.

To address this deficiency, static analysis tools and services have been developed. Static security analysis (or "static analysis" for short) solutions help organization address web and mobile application vulnerabilities through a secure-by-design approach. This approach embeds security testing into the software development lifecycle itself, providing organizations with the tools they require to develop more secure code. Static analysis tools are often used by computer software developers to provide information about computer software while applying only static considerations (i.e., without executing a computer software application). Such tools simplify remediation by identifying vulnerabilities in web and mobile applications prior to their deployment, generating results (reports and fix recommendations) through comprehensive scanning, and combining advanced dynamic and innovative hybrid analyses of glass-box testing (run-time analysis, also known as integrated application security testing) with static taint analysis for superior accuracy. Static analysis may be implemented as a standalone (e.g., desktop) tool "on-premises," or provided "as a service," using cloud-based resources. A representative commercial offering of this type is IBM® Security AppScan®, which enhances web application security and mobile application security, improves application security program management and strengthens regulatory compliance.

While static analysis has shown impressive success as an industry solution, some existing tools often report many false findings. This is not necessarily surprising, as automated analysis tools are challenged by the need to scale to large programs while executing fast and efficiently. There are also different aspects of various web and mobile applications that are difficult to model accurately, such as path conditions and deployment settings (e.g., browser version, back-end database, or the like). For the user, however, a significant usability barrier to such products and services is the need to review a prohibitive number of findings that are mostly false warnings. The user has to spend a long time on each finding, where typically false alarms are harder to prove as such than true vulnerabilities. This is because the user typically is in doubt whether there is something he or she is missing when concluding that the defect reported by the analysis is not a real one.

An available solution is for the user to influence which findings the analysis reports and how those findings are reported. For example, by editing applicable security rules, the user can request that the system not report any potential vulnerability that involves a certain resource, such as database APIs. The user also can control the severity level of a particular security rule, which has the effect of adjusting or modifying the category and priority assigned to a security alarm. While configuring security rules in this manner provides some advantages in addressing the problem, there remains a need to address the usability problem of false alarms generated by static security analysis.

BRIEF SUMMARY

According to this disclosure, user-guided machine learning (ML) provides a way to significantly reduce false alarms generated by an automated analysis tool performing static security analysis. Preferably, the approach requires only a limited amount of user interactivity (especially compared with prior techniques, which are very manually-intensive), with the information provided by the user facilitating the machine learning, which learning provides the bulk of the work necessary to characterize the static analysis results. The combined user interactivity and machine learning approach addresses the problem of false alarms without impacting the performance or scalability of the analysis tool, and without requiring users to review extensively the findings generated by such tools.

Preferably, user interactivity involves a simple initial user review and annotation of one or more sets of findings (security reports or "witnesses") in a report generated by the analysis tool. Those annotated findings are then used by the system to generate a "hypothesis" about how to further classify the static analysis findings in the report. Preferably, the hypothesis is implemented as a machine learning (ML) classifier. To facilitate the generation of the classifier, a set of features are abstracted from a typical witness, and the system compares feature sets against one another to determine a set of weights for the classifier. The initial hypothesis is then tested (validated) against a second set of user-annotated findings, and the classifier is adjusted as necessary based on how close it fits the new data. The validation testing is then iterated as necessary (or based on some configuration) to converge to a final classifier. The final classifier is then used as a filter to process remaining findings in the report. By combining user interactivity and machine learning in this manner, the extent to which the user is involved in the filtering process is significantly reduced.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
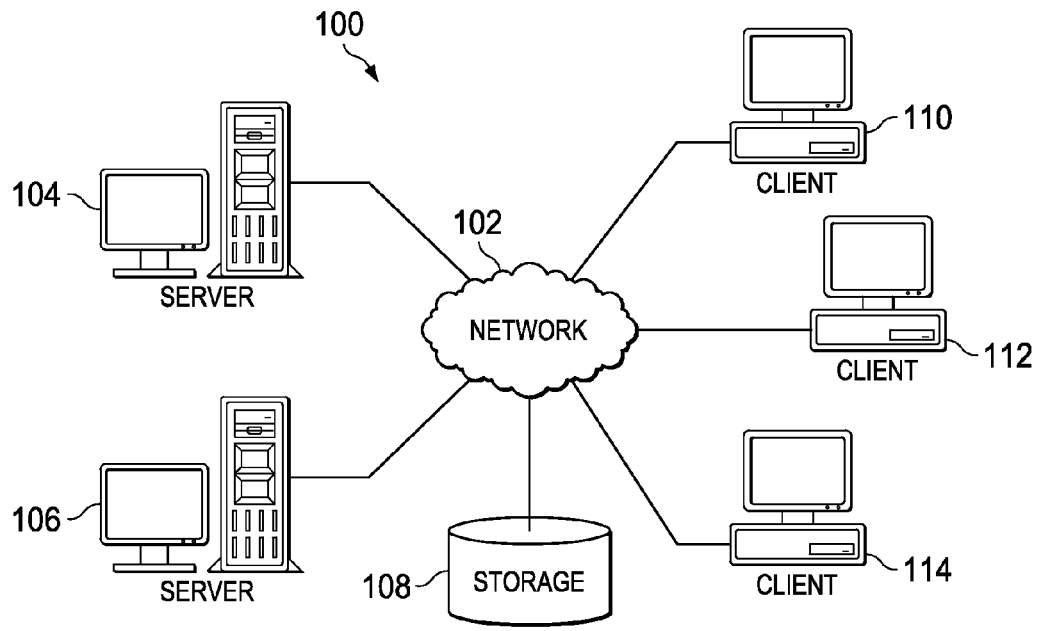
FIG. 1 depicts an exemplary block diagram of a distributed data processing environment in which exemplary aspects of the illustrative embodiments may be implemented.
Figure 2:
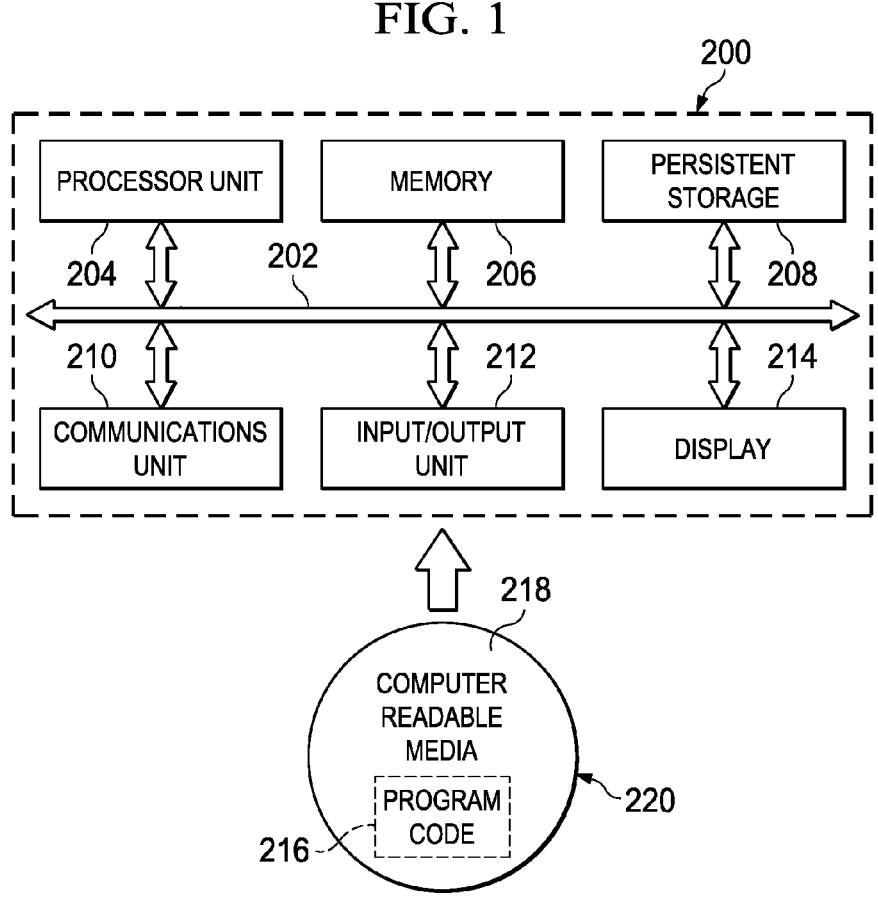
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
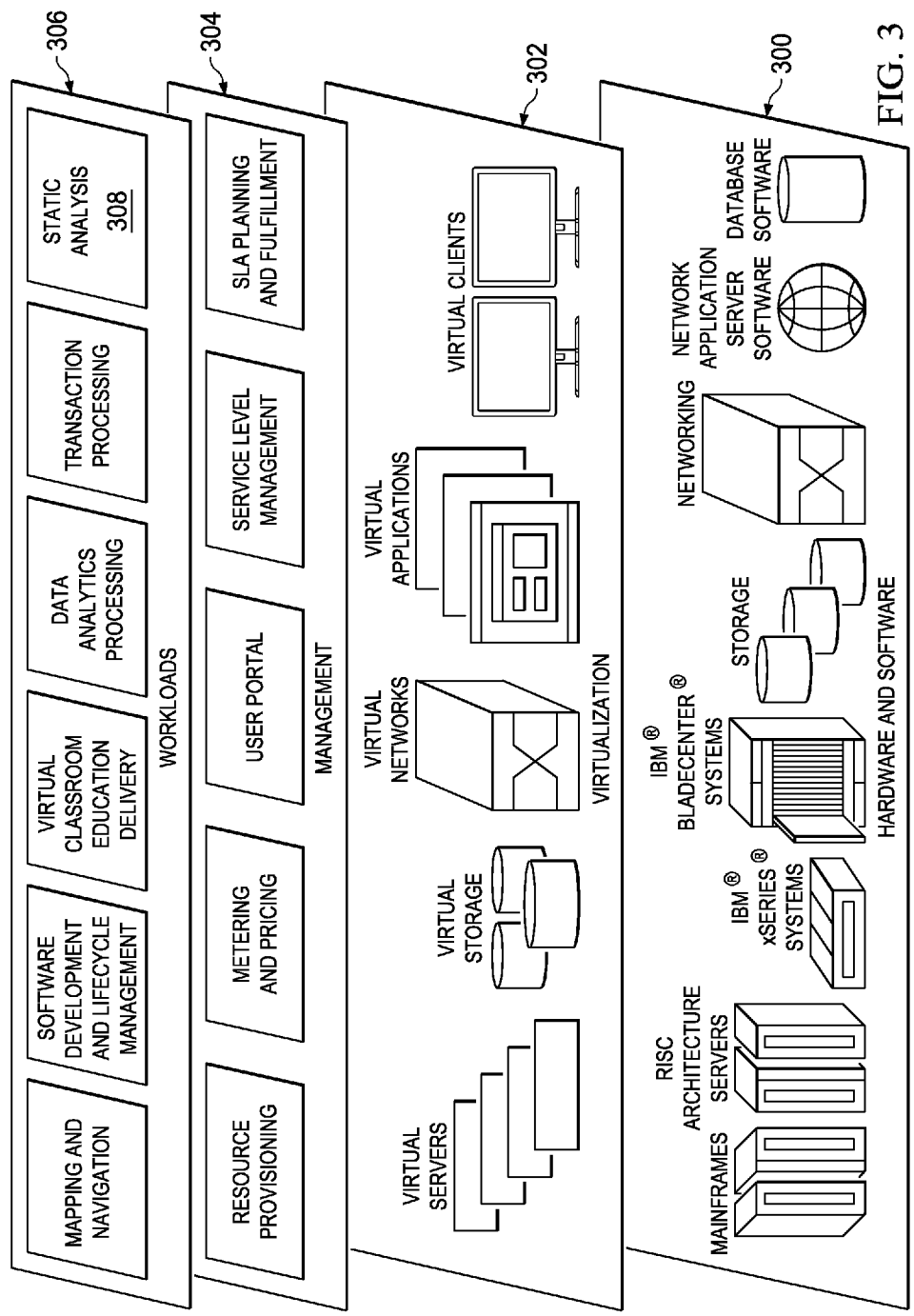
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; enterprise-specific functions in a private cloud; and, according to this disclosure, static security analysis 308.

It is understood in advance that although this disclosure includes a detailed description on cloud computing, implementation of the teachings recited herein are not limited to a cloud computing environment. Rather, embodiments of the disclosed technique are capable of being implemented in conjunction with any other type of computing environment now known or later developed. These include standalone computing environments (e.g., an on-premises desktop machine), client-server-based architectures, and the like.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System X® servers with VMware vSphere 4.1 Update 1 and 5.0.

In one embodiment, a static analysis tool, such as IBM AppScan Enterprise Edition, is implemented as a cloud-based application.

Static Analysis Tools and Services

As is well-known, static analysis tools are used by computer software developers to provide information about computer software while applying only static considerations (i.e., without executing a computer software application). More formally, and as used herein, the term "static program analysis" means an analysis of a static representation of an application. In one type of static analysis, data flows are traced within a computer software application from "sources," typically application programming interfaces (API) that introduce "untrusted" input into a program, such as user input, to "sinks," typically security-sensitive operations such as modifying a database. More generally, the term "sink" or "security sink" means a module, function or procedure that consumes in input value and performs an operation on the input value that is security sensitive.

Such flows are identified as security vulnerabilities that may require remediation, typically by ensuring that a flow that is identified as a security vulnerability encounters a "downgrader" that validates and/or sanitizes untrusted input, such as by checking whether the input contains illegal characters or is in an illegal format, both common tactics used in malicious attacks. Generalizing, a "downgrader" refers to a module, routing or function that endorses, sanitizes and/or validates input data. Static analysis tools that identify security vulnerabilities typically provide computer software developers with a short description of each type of security vulnerability found, and may even provide sample code snippets that may be used by the developer to construct a downgrader for remediating the security vulnerability.

In operation, a static program analysis may analyze a call-tree representing previously recorded call stacks of the application to identify security vulnerabilities that may be present in the application. The term "call stack" refers to a stack data structure that stores information about the active subroutines of a computer program, such as an application. Without limitation, the static security analysis typically takes the form of taint analysis, where the analysis is parameterized by a set of security rules, each rule being a triple <Source, San, Sink>, where Source denotes source statements that read untrusted user inputs, San denotes downgrader statements that endorse untrusted data by validating and/or sanitizing it, and Sink denotes sink statements which perform security-sensitive operations. Given a security rule R, any flow from a source in $Source_R$ to a sink in $Sink_R$ that does not pass through a downgrader from $San_R$ comprises a potential vulnerability. This approach thus reduces security analysis to a graph reachability problem.

More formally, the structure of a security alarm reported by a static security analysis tool is a sequence of code statements typically known as a "witness." A first statement along the sequence reads (untrusted) data input by the user (e.g., data from the file system, a socket, a database or an HTTP request). A last statement in the sequence performs a security-sensitive operation (e.g., updating a database or a file, rendering data to an HTTP response or writing to a socket). The first statement is the source, and the last statement is the sink. One or more intermediate statements establish data flow between the source and the sink. Relevant features that can be defined over a security witness include one or more of the following: witness length, namely, the length of the sequence; source type, namely, a security category of the source statement; sink type, namely, a security category of the sink statement; witness type, namely, the security vulnerability associated with the witness as a whole (e.g., cross-site scripting (XSS), SQL injection (SQLi), etc.); condition statements, namely, the number of conditional expressions (if and while statements) along the witness; method calls; namely, the number of method invocations along the witness; string operations, namely, the number of string operations applied to data flowing along the witness, and so forth. As an example, if the string value emanating from the source undergoes multiple string operations along the witness, then it is less likely to contain a security payload. Similarly, because static analysis is imprecise and can only approximate concrete program runs, a witness containing multiple branching statements and/or method invocations is less likely to be feasible.

As a concrete example, consider a call flow graph generated by a security scanning application with respect to a typical web application. The tool applies a static analysis to analyze the web application to identify potential security vulnerabilities. As noted, the control flow graph represents a model of data flow of web application during its execution, and identifies those parts of the application to which a particular value assigned to a variable might propagate. The control flow graph can be presented to a user as a security report. Moreover, the model represented by the control flow graph can be analyzed to facilitate identification of various security vulnerabilities. In particular, the control flow graph represents of one or more data flow paths that a value, such as user-provided data, assigned to a variable might traverse through the computer program during its execution. The control flow graph can include various nodes that represent statements, functions, methods and/or modules of the computer program. As described, respective nodes of the control flow graph can represent a source, a sink, and a downgrader. The control flow graph also can include a myriad of other nodes, such as node representing a module (or function, method or statement).

As described, the source is a statement in the computer program code that reads user-provided data assigns that data to a variable which is processed by the computer program. For example, in the web application, the source can read a user-provided HTTP parameter, a parameter in a uniform resource identifier (URI) (e.g., a uniform resource locator (URL)) field, alphanumeric text and/or symbols, data from a file or database, or the like. The sink is a statement in the computer program code that performs a security-sensitive operation on the user-provided data. In this example, the sink can read the user-provided data, store the user-provided data to a database (e.g., create or update a database record), initiate one or more operations corresponding to the user-provided data (e.g., delete a database record, retrieve data, etc.), read data from a file indicated by the user-provided data, render content indicated by the user-provided data to a response HTML message generated by a web application, or the like. As described, the downgrader is the function or module configured to endorse, validate and/or sanitize the user-provided data, which may be considered to be untrusted data. In this example, the downgrader can validate HTML encoding provided in the user-provided data, check for malicious patterns or content in the user-provided data, or the like.

During static analysis of the computer program, the security analysis application analyses the computer model represented by the control flow graph, to determine whether there are potential paths, during execution of the computer program, from the source to the sink without the user-provided data being downgraded by the downgrader. One such path is indicated in the control flow graph by an edge. This path generally is undesirable, and may indicate a security vulnerability in the computer program. In this regard, the edge can represent a witness to a security vulnerability, and thus (as described) is a witness that is then reported as a "finding" to the user.

Figure 4:
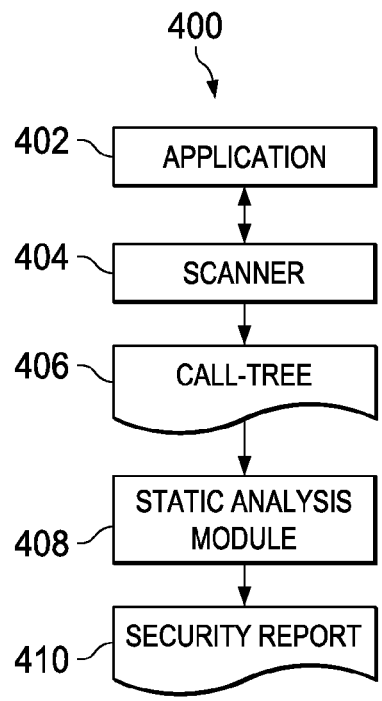
FIG. 4 is a block diagram illustrating a technique for analyzing vulnerable information flows in an application.

FIG. 4 is a block diagram illustrating a system 400 for analyzing vulnerable information flows in an application 402. In this example, a scanner used to create the call-tree is a black-box scanner, but this is not a limitation. As seen in FIG. 4, while the application 402 executes, the scanner 404 performs a scan of the application and, based on the scan, generates a call-tree 406 representing call stacks arising in the application during processing of test inputs provided to the application 402. The call-tree 406 may be pre-generated or provided from some other data source (e.g., a configuration file). As depicted, the system 400 includes a static analysis module 408 that performs a static analysis of the application 402. Specifically, the static analysis module 408 performs a static analysis of the call-tree 406 in which the call stacks identified by the black-box scanner 404 are recorded. As described above, in this way the static analysis module 408 can identify paths (i.e., flows) in the call-tree 406 that potentially represent security vulnerabilities in the application 402. For example, the static analysis module 408 can generate a security report 410 that indicates such paths as witnesses to security vulnerabilities. The security report 410 can be made to be available to a user in any suitable manner. For example, the security report 410 can be presented on a display, presented in a printout, stored to a file, or the like.

Auto-Tuning Program Analysis Tools Based on User Feedback

With the above as background, the subject matter of this disclosure is now described.

As noted above, the technique of this disclosure provides for user-guided machine learning (ML) to significantly reduce false alarms generated by an automated analysis tool performing static security analysis.

As will be seen, user interactivity typically involves a simple initial user review and annotation of one or more sets of findings (as being either true or false) in a report generated by the analysis tool. A user may annotate the findings in any convenient manner, such as by highlighting one or more findings presented in a display report and selecting an annotation function that provides the user with the true or false selection options. Those annotated findings comprise user-generated training classifications that are then used by the system to facilitate generation of a baseline hypothesis, e.g., in the form of a machine learning model or "classifier," against which additional static analysis findings in the report (or otherwise) can be automatically compared. For initial validation, preferably the hypothesis itself is tested against a second set of user-annotated findings that comprise validation classifications used to evaluate the classifier itself. Based on the results of this classifier validation testing, the hypothesis is refined as necessary until a final confirmed hypothesis is reached. The final hypothesis is then used to filter remaining findings in the report, preferably in an automated manner, thereby conserving or obviating further user review efforts. This processing eliminates witnesses in the report that represent false alarms.

As well-known, machine learning involves the construction of algorithms that learn from data. Such algorithms operate by building a model based on inputs, and using that model to make predictions or decisions, rather than following only explicitly programmed instructions. One categorization of machine learning tasks arises by considering the desired output of a machine-learned system. In a classification approach, inputs are divided into two or more classes, and the learner must produce a model that assigns unseen inputs to one or more of these classes. A particular ML type is decision tree learning. This type of learning uses a decision tree as a predictive model, which maps observations about an item to conclusions about the item. In the approach herein, preferably the machine learning model (the classifier) is generated and refined as needed using known machine learning tools and methods.

Figure 5:
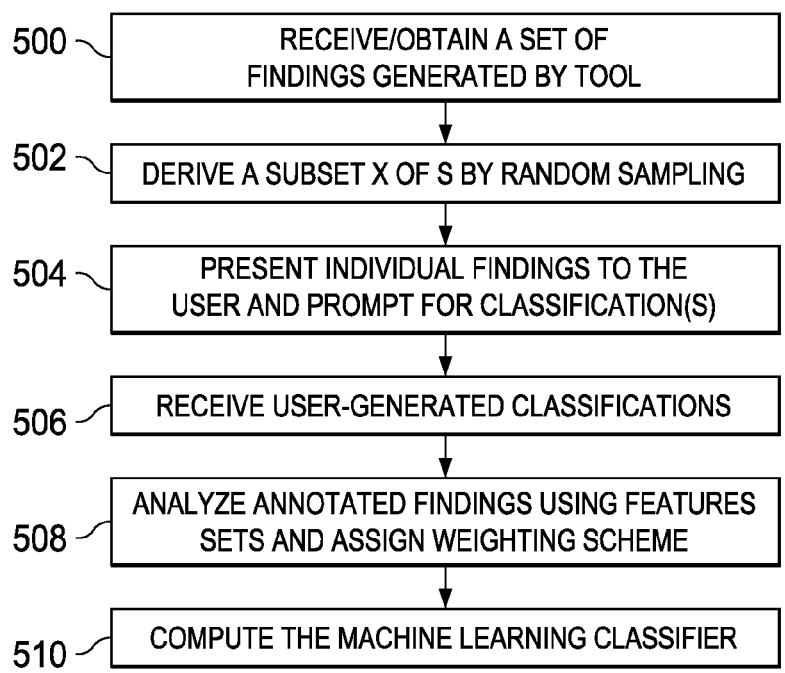
FIG. 5 is a process flow for generating a machine learning classifier function (or "hypothesis") for use in classifying static analysis tool findings according to this disclosure.

FIG. 5 illustrates the basic process flow of the user-guided machine learning technique of this disclosure. This process is sometimes referred to herein as "auto-tuning" because it operates automatically (at least in part) to tune the results (namely, the findings) provided by the security analysis tool. In effect, and as will be seen, the approach takes as input a given security report and its identified witnesses, and it generates a filter that is then used to eliminate automatically a number of witnesses from that report (or some other report) that a statistical model (used to create the filter) has shown are not true alarms.

The process begins at step 500 upon receipt or otherwise obtaining of a set S of findings (security reports) that have been generated by the static analysis tool, system or platform. The analysis functionality may operate in whole or in part in any convenient fashion, such as in a standalone manner using a computing entity as depicted in FIG. 2, in a client-server embodiment such as depicted in FIG. 1, or "as-a-service" accessible via a cloud such as depicted in FIG. 3. The set S typically comprises findings that are assumed to include witnesses that represent false alarms. As noted above, the technique in FIG. 5 uses a combination of user interactivity and machine learning to reduce meaningfully the number of witnesses that represent false alarms that must be identified (from this larger set) by the user, with the result being a subset S' of the original set S.

At step 502, a subset X of S is derived, e.g., by random sampling S uniformly. The subset X, which results from this random sampling operation, represents a "training" set. The training set may be derived from the set S in other ways, such as through pseudorandom sampling, or even deterministically, but a random sample is preferred. The number of findings in X is not limited to any particular number, but it is preferred to use a relatively modest number of findings to minimize user involvement in the annotation process.

At step 504, the individual findings comprising the subset X of S are then presented to the user. This training set is provided in any convenient manner, such as via a visual display, printed output, or the like. At step 506, the system receives data representing the user's annotation of a particular finding under review as being either "true" or "false." This data represents user feedback, and it may be received by the system in any convenient manner, e.g., data entry via a fill-in form, a selection box, or the like. The goal in steps 504 and 506 is to obtain the user's input or guidance to facilitate the development of a machine learning classifier that will then be used to train the system, while also to limit the extent to which the user has to participate in the training process (in particular by performing the review and annotation functions). More formally, step 506 obtains the user feedback on the findings in X, such that, for each x in X, the feedback is a pair (x, b), where b is a Boolean value indicating whether x is true. The pair (x, b) for a given finding is sometimes referred to herein as a classification tag. The "true" pairs are represented by data set $X_{true}$ and the "false" pairs are represented by data set $X_{false}$.

Based on the user's input (the classification tags) in this initial iteration, the system then continues at step 508 to analyze the annotated findings. According to a feature of this disclosure, the analysis is carried out with respect to a set of one or more witness "features" that in their aggregate comprise a feature vector. In particular, by reducing each witness to a feature vector (a set of features) and their associated values, the system can compare witnesses (as annotated) more efficiently, in particular, by analyzing and comparing their feature vectors. As will be seen, this enables the analysis to more readily converge on a set of features that best distinguish the "true" findings from the "false" findings, especially as the process is iterated. The analysis artifacts that comprise the set of features making up a feature vector may vary, but typically they include the feature set described above, namely: witness length, source type, sink type, witness type, conditional statements, method calls, string operations, and so forth. Given the relevant feature set, preferably the analysis operation in step 508 assigns "weights" to the different features, preferably by regressing over the findings in X according to the classification tags provided by the user in step 506. While regression analysis is a preferred technique to accomplish the weight assignment, it is not intended to be limiting, as other schemes to assign the weights may be utilized. For example, other schemes include, without limitation, tree- and rule-based classification, as well as clustering, or instance-based, classification. In the former case, classification is based either on a hierarchical decision tree that maximizes an information-gain criterion (tree-based classification), or on a set of covering rules. In the latter case, classification is based on the distance between a new instance (i.e., one that was not previously classified) and instances already classified by the user. The new instance assumes the same tag as the closest classified instance. For a new instance, the weights determine how to classify it per its extracted feature values.

Generally, weights are assigned so as to reflect a measure of correlation between given feature values and classification tags. Thus, if a given feature is highly correlated with an issue being a true or false vulnerability (different values assigned to the feature map distinctly to true/false), then that feature is assigned a high weight.

At step 510, the system computes a function, which is sometimes referred to herein as a "hypothesis," as to how to classify other findings. When regression analysis is used in step 508 to assign the feature weights, the hypothesis function is then generated as follows: (i) compute averages $A_{true}$ and $A_{false}$ over the findings in $X_{true}$ and $X_{false}$, respectively; and (ii) mark $\{(X_{true}+X_{false})/2\}$ as the threshold value for deciding the correctness of a new finding.

As one of ordinary skill will appreciate, the analysis functionality 508 generates the computed hypothesis function as a machine learning (ML) model based on inputs (the user's annotated findings as applied to the features). Thereafter, and as will be described further below, that model is then to make predictions or decisions on additional findings returned from the static analysis tool. In this classification approach, and as described, the inputs are divided into "true" and "false" classes, and the analysis functionality generates hypothesis (the classifier) that then assigns unseen inputs to one or more of these classes.

Figure 6:
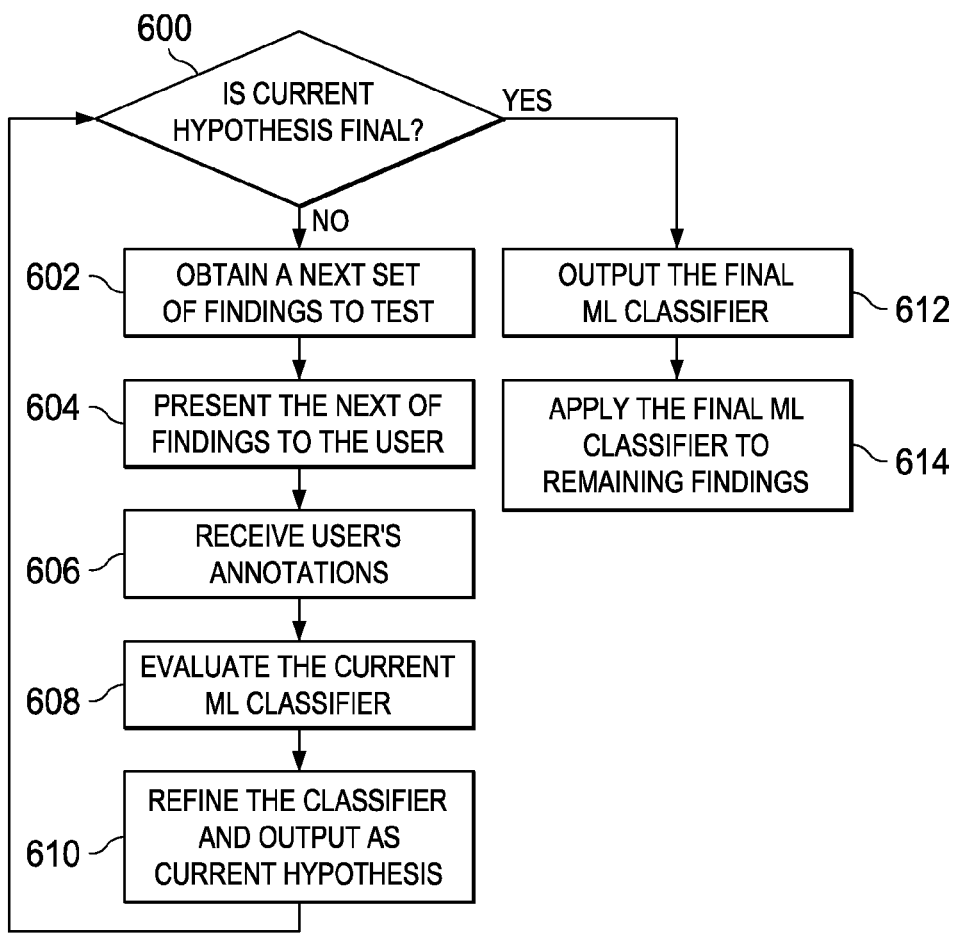
FIG. 6 is a process flow that may be used to refine the machine learning classifier function.

Preferably, the initial hypothesis, which is a ML classifier, is refined and made to be more robust through an iterative process, which is now described as shown in FIG. 6. The routine typically starts with the initial hypothesis function output from step 508 in FIG. 5. For purposes of this process flow, this initial hypothesis is also referred to as the "current hypothesis." At step 600, the routine tests to determine whether the current hypothesis is ready to be confirmed and applied as a filter against remaining finding in set S. If the outcome of the test at step 600 is negative, and typically it will be on the first iteration, the routine continues at step 602. At step 602, a next set of findings are obtained. Typically, this next set of findings is obtained by random sampling from (S−X), where X represents the original set of security reports received after removing the findings from the subset X originally provided to the user for classification. The resulting random sample in this scenario is subset Y, and this new subset represents a validation set of findings. The routine then continues at step 604 to present Y to the user and, at step 606, to obtain the user's classification tags for each finding in Y. The number of findings in Y is not limited to any particular number, but it is preferred to use a relatively modest number of findings to minimize user involvement in the annotation process.

At step 608, the validation set classifications provided by the user at step 606 are then used to evaluate the classifier. In particular, at this step, the classifier is first run against the findings in subset Y to generate an "expected" result; that expected result is then compared with the "actual" result, which constitutes the particular classification tags entered at step 606 by the user with respect to subject Y. A standard way of comparing between the expected and actual results is by means of precision and recall. Precision is a measure of false warnings (or false positives), whereas recall measures misses (or false negatives). There are standard ways, like F-measure, to combine precision and recall into an overall assessment of the quality of a classifier. Based on the comparison of the expected versus actual results, the system outputs a refined hypothesis at step 610. This can be done by retraining the classifier, this time instantiated with different parameters, until a variant of the classifier is found that achieves better accuracy. It is also possible to choose from a set of available classifiers. Processing control then returns back to step 600, with the refined hypothesis output at step 610 then becoming the current hypothesis for a next iteration.

The number of iterations may be deterministic or subject to some configurable confidence level or numerical limit. When the outcome of the test at step 600 is positive, the routine branches to step 612 and outputs the final version of the classifier.

At step 614, the classifier is then applied as the final filter to the remaining findings in S, where those findings are represented by the set $S_{final}$ derived from $\{S-(X+Y+\ldots)\}$, with the number of findings depending on how many iterations of the classifier processing are done.

The following provides a concrete example for a web application. Assume that the program under test by the static analysis tool includes a given method M that conditionally performs sanitization of the input it receives, and then passes that input to a security-sensitive operation. The condition depends, partly or fully, on the method's calling context. If the context is M', then sanitization does not take place. A typical user may have no knowledge of this non-trivial invariant, and so he or she would potentially report all flows through M as security warnings. These are false alarms. Using the user-guided machine learning approach described above, however, this latent invariant can be extracted by the classifier, thereby highlighting as security issues only the witnesses where M' is the caller of M. In like manner, other witnesses are eliminated automatically, significantly conserving review effort.

The auto-tuning process as described herein provides significant advantages. Most importantly, the routine eliminates or substantially reduces the witnesses in the set S that would otherwise have to be reviewed by the user manually. The user's involvement is kept to a minimum, as the process of providing the classification tags for the training and one or more validation set(s) preferably just requires a modest level of user involvement. The machine learning classifier(s) then provide the bulk of the work necessary to prune the findings appropriately. In this manner, the approach significantly reduces or eliminates the usability barrier to automated analysis tools of this type.

The approach herein solves the usability problems for static security analyses, but does not requires the analysis tool to be sufficiently precise to only rarely report false findings, which would otherwise come at the expense of performance, reliability or scalability. As described, the approach obviates the user having to manually review all the findings and determine their correctness, which is tiresome, bothersome and undermines the benefits of automation. Rather, in the described auto-tuning approach, the user and the analysis work in concert to provide an improved static analysis process.

The approach also provides significant advantages in providing improved techniques for generating "filters" that are based on machine learning classifiers. The approach is highly efficient and converges to a good and useful solution rapidly, in part by the abstracting process described. As noted, by abstracting witness findings using a feature vector space with comparable witness representations, the approach enables the system to converge on a set of features that best distinguish the "true" findings from the "false" ones. This feature set classification and weighting technique also would find use in other machine learning contexts.

Preferably, the techniques herein are implemented in associated with a static analysis tool, such as IBM Security AppScan. The reference to this commercial product is exemplary and should not be taken to limit the disclosed technique, which may be implemented on any appliance (or, more generally, machine) having the general characteristics and operating functionality that has been described.

This subject matter may be implemented as-a-service. As previously noted, and without limitation, the subject matter may be implemented within or in association with a cloud deployment platform system or appliance, or using any other type of deployment systems, products, devices, programs or processes. The machine learning (ML) functionality may be provided as a standalone function, or it may leverage functionality from other ML-based products and services.

A representative cloud application platform with which the auto-tuning service may be implemented includes, without limitation, any cloud-supported Static Application Security Testing (SAST) framework, product or service.

Generalizing, the techniques herein may be implemented as a management solution, service, product, appliance, device, process, program, execution thread, or the like. Typically, the techniques are implemented in software, as one or more computer programs executed in hardware processing elements, in association with data stored in one or more data sources, such as a problems database. Some or all of the processing steps described may be automated and operate autonomously in association with other systems. The automation may be full- or partial, and the operations (in whole or in part) may be synchronous or asynchronous, demand-based, or otherwise.

These above-described components typically are each implemented as software, i.e., as a set of computer program instructions executed in one or more hardware processors. The components are shown as distinct, but this is not a requirement, as the components may also be integrated with one another in whole or in part. One or more of the components may execute in a dedicated location, or remote from one another. One or more of the components may have sub-components that execute together to provide the functionality. There is no requirement that particular functions of the auto-tuning service be executed by a particular component as named above, as the functionality herein (or any aspect thereof) may be implemented in other or systems.

The auto-tuning functionality can interact or interoperate with security analytics systems or services.

As has been described, the functionality described above may be implemented as a standalone approach, e.g., one or more software-based functions executed by one or more hardware processors, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

As noted, and in addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the security assurance service (or any component thereof) is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, static security analysis tools and systems, as well as improvements to the functioning of user-guided machine learning tools and methods.

Having described our invention, what we now claim is as follows.

The invention claimed is:

1. A method to reduce false alarms generated by an automated analysis tool performing static security analysis, comprising:
   receiving a set of data representing findings generated by the automated analysis tool performing the static security analysis, wherein the automated analysis tool generates findings by static security analysis of a call-tree representing call stacks of an application under analysis and wherein at least one of the findings represents a vulnerability in the form of an unvalidated flow from a source to a sink in the application;
   with respect to a subset of the data, the subset of data being generated by random or pseudo-random sampling of the set of data, receiving user-generated classifications for each of the findings in the subset, the user-generated classification being that a particular finding either is true or false, wherein a remainder of the received set of data does not receive user-generated classifications;
   based on the user-generated classifications received with respect to the subset of the data, computing a machine learning classifier using software executing in a hardware element by:
      reducing each finding to a feature vector comprising a set of features common to each finding, wherein the set of features include one of: witness length, source type, sink type, witness type, conditional statements, method calls and string operations generated by the automated analysis tool performing the static security analysis;
      assigning weights to each of the set of features; and
      based on the assigned weights, computing a weighting function having a threshold value that determines a correctness of a new finding; and
   applying the machine learning classifier to the remainder of the received set of data to determine a fitness of the machine learning classifier to classify other findings generated by the static security analysis.

2. The method as described in claim 1 wherein the weights are assigned by applying a regression analysis over the findings in the subset of the data according to the user-generated classifications.

3. The method as described in claim 1 further including adjusting the machine learning classifier.

4. The method as described in claim 3 wherein the machine learning classifier is adjusted by:
   with respect to a second subset of the data, receiving user-generated classifications for each of the findings in the second subset;
   comparing an expected result of applying the classifier against the user-generated classifications for each of the findings in the second subset with the user-generated classifications to determine a fit for the classifier; and
   adjusting the classifier as necessary based on the fit.

5. The method as described in claim 1 further including random sampling the set of data to generate the subset.

6. Apparatus, comprising:
   a processor;
   computer memory holding computer program instructions executed by the processor to reduce false alarms generated by an automated analysis tool performing static security analysis, the computer program instructions operative to:
   receive a set of data representing findings generated by the automated analysis tool performing the static security analysis, wherein the automated analysis tool generates findings by static security analysis of a call-tree representing call stacks of an application under analysis and wherein at least one of the findings represents a vulnerability in the form of an unvalidated flow from a source to a sink in the application;
   with respect to a subset of the data, the subset of data being generated by random or pseudo-random sampling of the set of data, receive user-generated classifications for each of the findings in the subset, the user-generated classification being that a particular finding either is true or false, wherein a remainder of the received set of data does not receive user-generated classifications;
   based on the user-generated classifications received with respect to the subset of the data, compute a machine learning classifier by:
      reducing each finding to a feature vector comprising a set of features common to each finding, wherein the set of features include one of: witness length, source type, sink type, witness type, conditional statements, method calls and string operations generated by the automated analysis tool performing the static security analysis;
      assigning weights to each of the set of features; and
      based on the assigned weights, computing a weighting function having a threshold value that determines a correctness of a new finding; and
   apply the machine learning classifier to the remainder of the received set of data to determine a fitness of the machine learning classifier to classify other findings generated by the static security analysis.

7. The apparatus as described in claim 6 wherein the weights are assigned by computer program instructions that are further operative to apply a regression analysis over the findings in the subset of the data according to the user-generated classifications.

8. The apparatus as described in claim 6 wherein the computer program instructions are further operative to adjust the machine learning classifier.

9. The apparatus as described in claim 8 wherein the computer program instructions that adjust machine learning classifier include computer program instructions that are further operative to:
   with respect to a second subset of the data, receive user-generated classifications for each of the findings in the second subset;
   compare an expected result of applying the classifier against the user-generated classifications for each of the findings in the second subset with the user-generated classifications to determine a fit for the classifier; and
   adjust the classifier as necessary based on the fit.

10. The apparatus as described in claim 6 wherein the computer program instructions are further operative to random sample the set of data to generate the subset.

11. A computer program product in a non-transitory computer readable medium for use in a data processing system, the computer program product holding computer program instructions executed by the data processing system to reduce false alarms generated by an automated analysis tool performing static security analysis, the computer program instructions operative to:
  receive a set of data representing findings generated by the automated analysis tool performing the static security analysis, wherein the automated analysis tool generates findings by static security analysis of a call-tree representing call stacks of an application under analysis and wherein at least one of the findings represents a vulnerability in the form of an unvalidated flow from a source to a sink in the application;
  with respect to a subset of the data, the subset of data being generated by random or pseudo-random sampling of the set of data, receive user-generated classifications for each of the findings in the subset, the user-generated classification being that a particular finding either is true or false, wherein a remainder of the received set of data does not receive user-generated classifications;
  based on the user-generated classifications received with respect to the subset of the data, compute a machine learning classifier by:
    reducing each finding to a feature vector comprising a set of features common to each finding, wherein the set of features include one of: witness length, source type, sink type, witness type, conditional statements, method calls and string operations generated by the automated analysis tool performing the static security analysis;
    assigning weights to each of the set of features; and
    based on the assigned weights, computing a weighting function having a threshold value that determines a correctness of a new finding; and
  apply the machine learning classifier to the remainder of the received set of data to determine a fitness of the machine learning classifier to classify other findings generated by the static security analysis.

12. The computer program product as described in claim 11 wherein the weights are assigned by computer program instructions that are further operative to apply a regression analysis over the findings in the subset of the data according to the user-generated classifications.

13. The computer program product as described in claim 11 wherein the computer program instructions are further operative to adjust the machine learning classifier.

14. The computer program product as described in claim 13 wherein the computer program instructions that adjust machine learning classifier include computer program instructions that are further operative to:
  with respect to a second subset of the data, receive user-generated classifications for each of the findings in the second subset;
  compare an expected result of applying the classifier against the user-generated classifications for each of the findings in the second subset with the user-generated classifications to determine a fit for the classifier; and
  adjust the classifier as necessary based on the fit.

15. The computer program product as described in claim 11 wherein the computer program instructions are further operative to random sample the set of data to generate the subset.

16. The method as described in claim 1 wherein reducing the feature vector aggregates the set of features and their associated values as generated by the automated analysis tool performing the static security analysis.

17. The apparatus as described in claim 6 wherein reducing the feature vector aggregates the set of features and their associated values as generated by the automated analysis tool performing the static security analysis.

18. The computer program product as described in claim 11 wherein reducing the feature vector aggregates the set of features and their associated values as generated by the automated analysis tool performing the static security analysis.

* * * * *